United States Patent
Friedman et al.

(10) Patent No.: US 9,407,695 B2
(45) Date of Patent: *Aug. 2, 2016

(54) ADAPTIVE SYNCHRONIZATION OF SERVICE DATA

(75) Inventors: Gregory Scott Friedman, Redmond, WA (US); Coyle Brett Marl, Seattle, WA (US)

(73) Assignee: Good Technology Corporation, Sunnyvale, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/900,128

(22) Filed: Oct. 7, 2010

(65) Prior Publication Data

US 2011/0246587 A1    Oct. 6, 2011

Related U.S. Application Data

(63) Continuation of application No. 11/872,633, filed on Oct. 15, 2007, now Pat. No. 8,412,805, which is a continuation of application No. 10/425,981, filed on Apr. 30, 2003, now abandoned, which is a (Continued)

(51) Int. Cl.
G06F 15/16 (2006.01)
H04L 29/08 (2006.01)
(Continued)

(52) U.S. Cl.
CPC .......... *H04L 67/1095* (2013.01); *G06Q 10/107* (2013.01); *H04L 51/22* (2013.01); *H04L 69/329* (2013.01); *H04L 51/38* (2013.01)

(58) Field of Classification Search
CPC .............. H04L 47/624; H04L 65/1079; H04L 29/1215

USPC ................. 709/246, 206, 200, 217; 707/201; 370/503

See application file for complete search history.

(56) References Cited

U.S. PATENT DOCUMENTS 5,818,845 A    10/1998    Moura et al.
5,859,852 A     1/1999    Moura et al.
(Continued)

FOREIGN PATENT DOCUMENTS

JP    11-65962     3/1998
JP    11-127191    5/1999
(Continued)

OTHER PUBLICATIONS

Miwa Yoshihisa, "Dissecting electronic mails, Total elucidation of backstage events when mails are received", Nikkei Network, vol. 12, Japan, Nikkei BP Co., Nikkei Bussiness Publications, Inc., Mar. 22, 2001, pp. 70-77.

(Continued)

*Primary Examiner* — El Hadji Sall
*Assistant Examiner* — Benjamin Ailes
(74) *Attorney, Agent, or Firm* — Fish & Richardson P.C.

(57) ABSTRACT

Techniques are disclosed for synchronizing service data between a data store and a device using the service data. These synchronization techniques may be used with a synchronization method and device that adaptively adjust synchronization parameters, such as the synchronization interval and quantity of synchronized data, on a per-end-user basis in response to actual end-user behavior. In particular, heavy users of service data are rewarded with improved synchronization parameters, such as a combination of shorter synchronization intervals and increased synchronization data quantities, which provides closer to "direct access" performance. Light users of service, on the other hand, are assigned lower cost synchronization parameters, such as longer synchronization intervals and/or decreased synchronization data quantities.

50 Claims, 4 Drawing Sheets

Related U.S. Application Data continuation-in-part of application No. 09/872,753, filed on Jun. 1, 2001, now Pat. No. 7,228,383.

(60) Provisional application No. 60/376,962, filed on Apr. 30, 2002.

(51) Int. Cl.
*G06Q 10/10* (2012.01)
*H04L 12/58* (2006.01)

(56) References Cited

U.S. PATENT DOCUMENTS

| | | | |
|---|---|---|---|
| 5,896,561 A | 4/1999 | Schrader et al. | |
| 5,961,590 A | 10/1999 | Mendez et al. | |
| 5,968,131 A | 10/1999 | Mendez et al. | |
| 6,005,850 A | 12/1999 | Moura et al. | |
| 6,006,017 A | 12/1999 | Joshi et al. | |
| 6,034,621 A * | 3/2000 | Kaufman | 340/7.21 |
| 6,125,369 A | 9/2000 | Wu et al. | |
| 6,148,410 A | 11/2000 | Baskey et al. | |
| 6,393,434 B1 | 5/2002 | Huang et al. | |
| 6,401,112 B1 | 6/2002 | Boyer et al. | |
| 6,442,569 B1 | 8/2002 | Crapo et al. | |
| 6,446,090 B1 | 9/2002 | Hart | |
| 6,621,827 B1 * | 9/2003 | Rezvani et al. | 370/449 |
| 6,636,873 B1 | 10/2003 | Carini et al. | |
| 6,725,239 B2 | 4/2004 | Sherman et al. | |
| 6,889,333 B2 | 5/2005 | Lawrence et al. | |
| 6,901,415 B2 | 5/2005 | Thomas et al. | |
| 6,910,052 B2 | 6/2005 | Gates et al. | |
| 6,912,395 B2 | 6/2005 | Benes et al. | |
| 6,931,454 B2 | 8/2005 | Deshpande et al. | |
| 7,024,491 B1 | 4/2006 | Hanmann et al. | |
| 7,031,956 B1 | 4/2006 | Lee et al. | |
| 7,085,809 B2 | 8/2006 | Mori et al. | |
| 7,149,798 B2 | 12/2006 | Rezvani et al. | |
| 7,197,288 B1 | 3/2007 | Ngan et al. | |
| 7,275,073 B2 | 9/2007 | Ganji et al. | |
| 7,386,715 B2 * | 6/2008 | Lawrence et al. | 713/100 |
| 7,734,586 B2 * | 6/2010 | Mohler et al. | 707/628 |
| 8,255,359 B2 * | 8/2012 | Quinlan et al. | 707/613 |
| 2001/0029502 A1 | 10/2001 | Oeda | |
| 2002/0099772 A1 | 7/2002 | Deshpande et al. | |
| 2002/0132609 A1 | 9/2002 | Lewis et al. | |
| 2002/0138599 A1 | 9/2002 | Dilman et al. | |
| 2002/0174180 A1 | 11/2002 | Brown et al. | |
| 2002/0174372 A1 | 11/2002 | Venkataraman | |
| 2002/0194177 A1 | 12/2002 | Sherman et al. | |
| 2002/0194205 A1 | 12/2002 | Brown et al. | |
| 2002/0199024 A1 | 12/2002 | Givoly et al. | |
| 2003/0046433 A1 * | 3/2003 | Luzzatti et al. | 709/248 |
| 2003/0050046 A1 | 3/2003 | Conneely et al. | |
| 2003/0081557 A1 | 5/2003 | Mettala et al. | |
| 2003/0084361 A1 | 5/2003 | Lawrence et al. | |
| 2003/0097433 A1 | 5/2003 | Park et al. | |
| 2004/0158613 A1 * | 8/2004 | Sommerer | 709/206 |
| 2005/0004992 A1 * | 1/2005 | Horstmann et al. | 709/206 |
| 2005/0144293 A1 | 6/2005 | Limont et al. | |
| 2005/0289243 A1 | 12/2005 | McInerney | |
| 2006/0031645 A1 * | 2/2006 | Flanagin et al. | 711/159 |
| 2006/0112150 A1 | 5/2006 | Brown et al. | |
| 2006/0171420 A1 * | 8/2006 | Chu et al. | 370/503 |
| 2006/0235898 A1 | 10/2006 | Loveland | |
| 2007/0162519 A1 | 7/2007 | Straube et al. | |
| 2007/0192483 A1 | 8/2007 | Rezvani et al. | |
| 2009/0055434 A1 | 2/2009 | Chasman et al. | |
| 2009/0067452 A1 | 3/2009 | Filipovic et al. | |
| 2011/0269424 A1 | 11/2011 | Multer et al. | |
| 2012/0131095 A1 * | 5/2012 | Luna et al. | 709/203 |

FOREIGN PATENT DOCUMENTS

| | | |
|---|---|---|
| JP | 11-306111 | 11/1999 |
| JP | 2000-10879 | 1/2000 |
| JP | 2000-268053 | 9/2000 |
| JP | 2000-286884 | 10/2000 |
| JP | 2001-229066 | 8/2001 |
| JP | 2001-297023 | 10/2001 |
| JP | 2002-007192 | 1/2002 |
| WO | WO 02/21777 A1 | 3/2002 |

OTHER PUBLICATIONS

Ward Foster et al.: "Method for reducing polling traffic within a mailbox communication system", Mar. 28, 2007.

* cited by examiner

ADAPTIVE SYNCHRONIZATION OF SERVICE DATA

This application is a continuation of U.S. application Ser. No. 11/872,633, filed Oct. 15, 2007, which is a continuation of U.S. application Ser. No. 10/425,981, filed Apr. 30, 2003, which claims priority under 35 U.S.C. §120 to U.S. patent application Ser. No. 09/872,753, filed Jun. 1, 2001, entitled "System And Method For Progressive And Hierarchical Caching," which applications are incorporated entirely herein by reference. This application also claims priority under 35 U.S.C. §119(e) to U.S. Provisional Patent Application No. 60/376,962, filed on Apr. 30, 2002, entitled "Adaptive Synchronization Of Service Data," which application is incorporated entirely herein by reference as well.

FIELD OF THE INVENTION

Various aspects of the present invention relate to a method and device for adaptively changing the synchronization parameters for synchronizing service data between an institutional data store associated with a user and a service provider providing telecommunication services for the user.

BACKGROUND OF THE INVENTION

Many telecommunication service users obtain their services for or through a corporation or other institution. Thus, a user may obtain a wireless telephone service, electronic mail service, voice dialing service or the like for his or her use as an employee of a corporation. With this arrangement, the institution, the user or both may want the service provider to provide its services using specific data, hereafter referred to as service data, which includes data stored in the institution's database. For example, a user may subscribe to a voice activated dialing (VAD) service for work. The user or the user's employer might then want the service provider to provide the service using service data that includes the contact information stored in the employer's corporate database.

Service providers face a "firewall challenge," however, when trying to provide services to end users based upon proprietary institutional databases. Specifically, the service providers must deploy their services using infrastructure housed within their data centers and/or networks; but these data centers and networks are situated outside of the security systems or "firewalls" that many institutions use to protect their propriety networks and infrastructure from unauthorized access. Thus, with the example of a voice activated dialing (VAD) service noted above, the employer's contact information may be stored and maintained in a server such as Microsoft Exchange® server or a Lotus Domino® server situated behind the employer's corporate firewall.

For the end user in this example, the simplest solution would be to have the service provider's VAD system directly access the employer's Microsoft Exchange® or Lotus Domino® server and extract the user's contact information directly, without requiring the user's involvement (other than, perhaps, to provide the user's username and password in order to give the provider initial access to the employer's Microsoft Exchange® or Lotus Domino® server). This approach, however, while easiest for the end user and desirable from the service provider's point-of-view, is not one that that will typically meet with the institution's approval. On one hand, the institution will not want its end users to be storing corporate credentials (used to access the institution's servers) on a system located outside the institution's domain. On the other hand, if a service provider's single system attempts to access data within an institution's server on behalf of multiple end users, the institution may have difficulty distinguishing this legitimate access from a hacker's attack, as they have similar characteristics.

One conventional solution to this "firewall challenge" is to deploy a Virtual Private Network (VPN) that securely bridges the service provider's network and infrastructure to the institution's network and infrastructure. Virtual Private Networks have a disadvantage, however, in that they require the institution's participation and significant resources to deploy and support. This disadvantage can be especially cumbersome for larger companies or institutions that are likely to have relationships with several different service providers and/or multiple networks (e.g., for different geographic regions, business units, subsidiaries, etc.).

Still another disadvantage associated with Virtual Private Networks is that they are based on "tunneling" a secure communication session within an insecure communication session that is transported over the public Internet. While this technique avoids the costs associated with building large private networks, it can lead to performance issues, as the "tunneling" process induces additional latency on top of the latency already inherent in communication over the Internet. Further, because Virtual Private Networks are built on top of the Internet, over which neither the service provider nor the institution can have total control, performance of Virtual Private Networks can vary significantly based on time-of-day, geography, and a number of other external Another conventional solution to the "firewall challenge" uses synchronization technology. With this technique, the data normally stored and managed in the institution's platforms, like Microsoft Exchange® servers and Lotus Domino® servers, situated behind the institution's firewall, is replicated in one or more platforms maintained by the service provider. More particularly, a device behind the institution's firewall periodically connects to the service provider's system in order to (1) communicate changes made to the user's data through the user's normal interaction with the institution's systems, (2) determine if changes have been made to the user's service data as a result of the end user's interaction with the service provider, and (3), as needed, transfer data between the institution's system and the service provider's system and otherwise synchronize multiple instances of the user's service data. This approach overcomes the "firewall challenge" because the synchronization process can be initiated by a system operating within the institution's domain using an approved data transfer protocol, such as HTTP, its encrypted variant, HTTPS, or any other suitable data transfer protocol.

This approach relies on these periodic connections, or "polling", because the institution's firewall prevents the service provider's systems from sending "change requests" to the institution's systems exactly when such change events occur. In other words, because the service provider's systems cannot directly communicate changes to the service data when and only when such changes occur, the institution's systems must instead periodically "check in" with the service provider's systems to determine if changes have occurred, even if none have. Failure to regularly make a periodic check could leave important changes un-synchronized, leading to user confusion or worse. For example, a time-critical electronic mail message initiated through the service provider's systems may go undelivered to one or more recipients for an unacceptable period of time, or a meeting initiated through the service provider's systems may not be reflected in the institution's systems in a timely fashion leading to a "double-booking" or other conflict in the user's schedule.

The conventional synchronization solution does have some problems, however. Because the synchronization process is initiated by a device or system operating behind the institution's firewall and within the institution's domain, it is necessary for such solutions to employ a "polling" approach where the institution's system periodically polls the service provider's system, as noted above. The selection of the polling interval or "synchronization interval" offers significant tradeoffs. This is because each concurrent connection has both a fixed and recurring cost component and the shorter the synchronization interval the greater the peak number of concurrent connections will be over a given period of time.

The selection of how much and the type of data to be synchronized during each synchronization process also presents significant tradeoffs. Like the synchronization operation, data storage also has fixed and recurring costs, so it is not desirable to store any more data than is needed. Also, the amount of synchronized data is related to the synchronization interval because it takes a finite amount of time to synchronize one or more data sets. Thus the larger the size of each synchronized data set and/or the greater the number of such sets, the longer the required synchronization interval. Otherwise, the number of concurrent synchronization communication sessions required to service every end user would approach the number of overall end users, which would be cost-prohibitive.

Still further, the synchronization interval and the amount of synchronized data both impact the end user's satisfaction. The shorter the synchronization interval, the more closely the synchronization process emulates the responsiveness of a direct access model where the service provider is able to access data in real-time directly from the institution's applications and systems. Similarly, the greater the quantity of data synchronized the synchronization process, the more closely the synchronization process emulates the responsiveness of the service provider accessing all available data by interfacing directly with institution's applications and systems.

The standard solution to these synchronization tradeoffs is to take one of the following approaches: (1) fixed synchronization interval, fixed synchronization data quantity, (2) fixed synchronization interval, user-defined synchronization data quantity, (3) user-defined synchronization interval, fixed synchronization data quantity, or (4) user-defined synchronization interval, user-defined synchronization data quantity. Each of these approaches has drawbacks, however. For example, the fixed synchronization interval, fixed synchronization data quantity approach offers predictable costs and is simple in that no end-user decision-making or configuration is required, but this approach uses an arbitrary synchronization interval and an arbitrary synchronization data quantity that may not meet the needs of all end users.

With the fixed synchronization interval, user-defined synchronization data quantity arrangement, the storage costs are not predictable, and the end-user must be involved in deciding upon and configuring the synchronization data quantity. Moreover, users will tend to "maximize" the synchronized data quantities, thereby driving up storage costs. With the user-defined synchronization interval, fixed synchronization data quantity approach, the connection costs are not predictable, and the end-user must be involved in deciding upon and configuring the synchronization interval. Further, users will tend to "minimize" their synchronization intervals, thereby driving up concurrent connection costs. Lastly, with the user-defined synchronization interval, user-defined synchronization data quantity arrangement, both the connection costs and the storage costs are unpredictable and the end-user must be involved in a significant amount of decision-making and configuration to determine both the synchronization interval and the synchronization data quantities. Moreover, users will tend to minimize the synchronization interval and maximize the synchronized data quantities, driving up both connection costs and the storage costs

BRIEF SUMMARY OF THE INVENTION

Accordingly, there is a need for synchronization techniques that allow a service provider to obtain more efficient synchronization parameters for synchronizing its service data between service data stored in an institutional data store associated with a user. Various examples of the present invention advantageously offer a synchronization method and device that adaptively adjusts synchronization parameters, such as the synchronization interval and quantity of synchronized data, on a per-end-user basis in response to actual end-user behavior. In particular, heavy users of service data are rewarded with improved synchronization parameters, such as a combination of shorter synchronization intervals and increased synchronization data quantities, which provides closer to "direct access" performance. Light users of service, on the other hand, are assigned lower cost synchronization parameters, such as longer synchronization intervals and/or decreased synchronization data quantities.

The various embodiments of the invention thus allow synchronization resources that would otherwise be wasted on light users to be conserved and allocated to heavy users. According to the invention, the synchronization parameters continually change as user behavior changes, such as when a light user begins to use service more heavily, so as to constantly optimize the resources employed by the service provider on both an individual and aggregate basis.

DETAILED DESCRIPTION OF EXAMPLES OF THE INVENTION

As is well known in the art, telecommunication service data used to provide telecommunication services, such as wireless telephone service, electronic mail, voice mail and the like, is conventionally stored and manipulated by programmable computers. This type of computer can be embodied by, for example, an electronic mail account server, a wireless application protocol (WAP) gateway device, or a voice mail services server. Further, this type of computer can be used to implement an adaptive synchronization device according to various embodiments of the invention.

Figure 1:
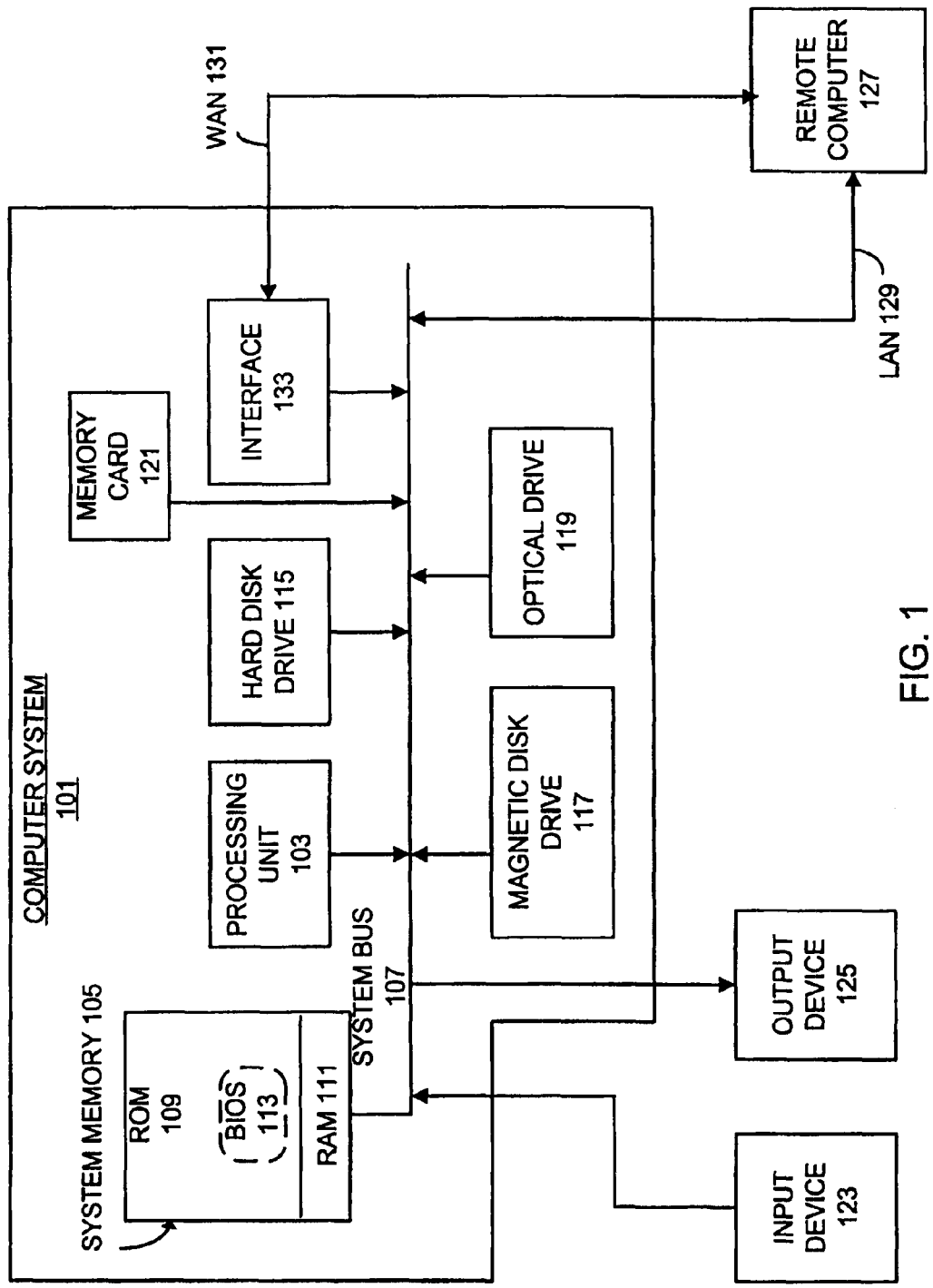
FIG. 1 shows one example of a programmable computer that may be used to implement various embodiments of the invention.

FIG. 1 shows one example of such a programmable computer system 101 capable of synchronizing service data between a telecommunication service provider and a data store associated with an end user of the service provider's telecommunication services. The computer system 101 includes a processing unit 103, a system memory 105, and a system bus 107 that couples various system components, including the system memory 105, to the processing unit 103. The system memory 105 may include a read-only memory (ROM) 109 and a random access memory (RAM) 111.

A basic input/output system 113 (BIOS), containing the routines that help to transfer information between elements within the computer system 101, such as during startup, may be stored in the read-only memory (ROM) 109. If the computer system 101 is embodied by a personal computer, it may further include a hard disk drive 115 for reading from and writing to a hard disk (not shown), a magnetic disk drive 117 for reading from or writing to a removable magnetic disk (not shown), or an optical disk drive 119 for reading from or writing to a removable optical disk (not shown) such as a CD-ROM or other optical media.

A number of program modules may be stored on the ROM 109, the hard disk drive 115, the magnetic disk drive 117, and the optical disk drive 119. A user may enter commands and information into the computer system 101 through an input device 123, such as a keyboard, a pointing device, a touch screen, a microphone, a joystick or any other suitable interface device. Of course, the computer system 101 may employ a variety of different input devices 123, as is known in the art. An output device 125, such as a monitor or other type of display device, is also included to convey information from the computer system 101 to the user. As will be appreciated by those of ordinary skill in the art, a variety of output devices 125, such as speakers and printers, may alternately or additionally be included in the computer system 101.

In order to access both the computing systems employed by one or more service providers and one or more data stores associated with an end user, the computer system 101 preferably is capable of operating in a networked environment using logical connections to one or more remote computers, such as the remote computer 127. The computer system 101 may be connectable to the remote computer 127 through a local area network (LAN) 129 or a wide area network (WAN) 131, such as the Internet. When used in a networking environment, the computer system 101 may be connected to the network through an interface 133, such as a wireless transceiver, a modem, an Ethernet connection, or any other such interface. While the interface 133 is illustrated as an internal interface in FIG. 1, it may alternately be an external interface as is well known in the art. Of course, it will be appreciated that the network connections shown in this figure are exemplary, and other means of establishing a communications link with other computers to access an electronic mail account may be used.

Figure 2:
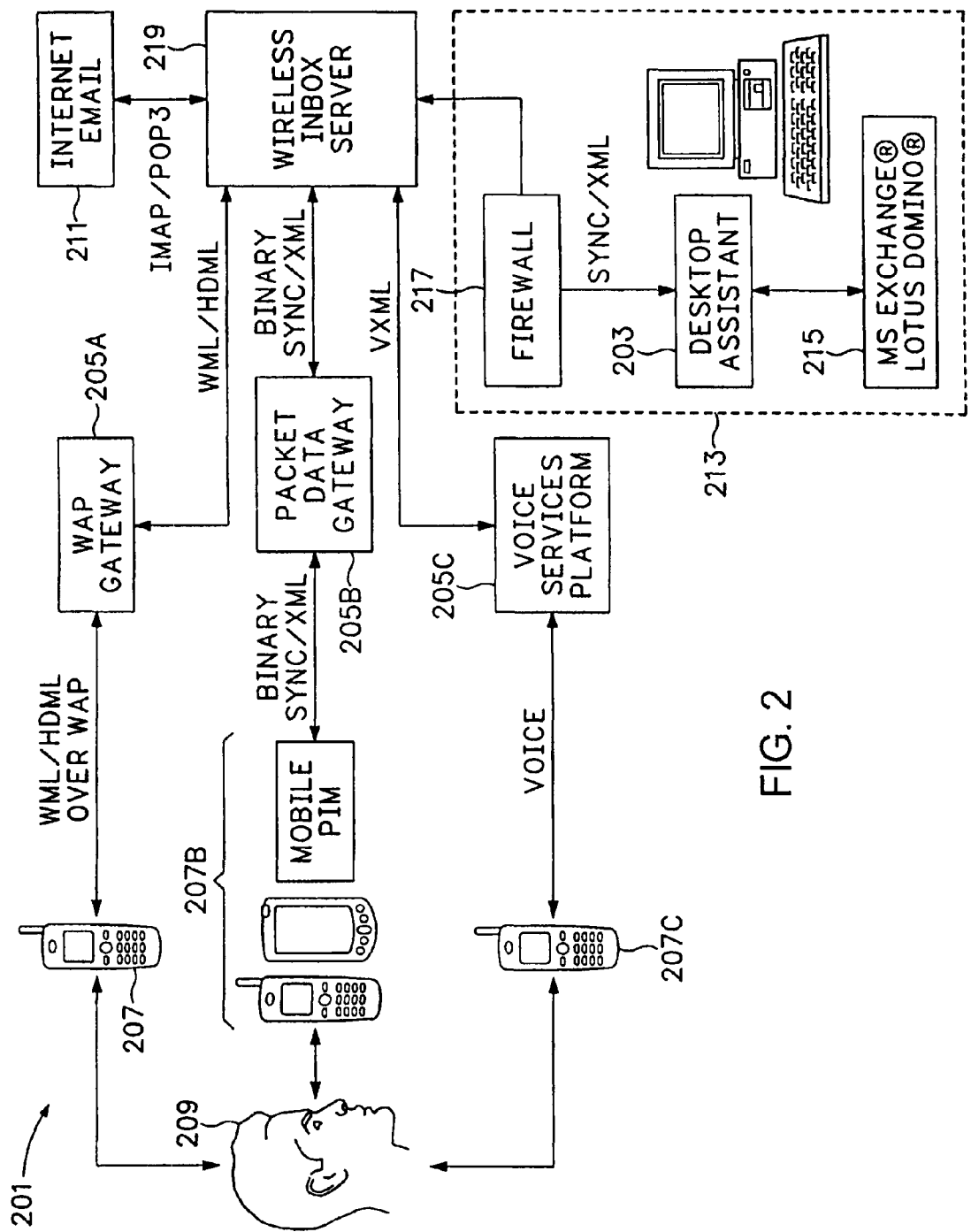
FIG. 2 shows a network employing a synchronization device according to one embodiment of the invention.

FIG. 2 illustrates a network 201 of devices that include an adaptive synchronization device 203. The network 201 also includes a variety of service provider (or service carrier) infrastructure systems 205. As is known in the art, these service provider infrastructure systems 205 are used to provide telecommunication services to a variety of telecommunication devices 207 employed by an end user 209. For example, the service provider infrastructure system 205A may be a wireless application protocol gateway that communicates with a wireless telecommunication device, such as a wireless telephone or personal information manager, using the wireless mark-up language (WML), the hand-held device mark-up language (HDML), or another suitable communication language.

Similarly, the service provider infrastructure system 205B may be a packet data gateway for transmitting and receiving information to, e.g., a mobile personal information manager such as a Palm or a Pocket PC-based computing device. The packet data gateway 205B may communicate with the mobile personal information management device 207B using any suitable communication method, such as a binary synchronization process or an extensible mark-up language (XML). Still further, as shown in FIG. 2, the service provider infrastructure system 205C may be a voice services platform for transmitting voice messages to and receiving voice messages from a wireless telephone 207C. In addition, the network 201 may include one or more service provider service data stores 211. As known in the art, these service data stores 211 (e.g., Internet electronic mail servers) store service data used by service carriers to provide telecommunication services, such as electronic mail services, to the end user 209.

Referring back to FIG. 2, the adaptive synchronization device 203 is included in a subnetwork 213 associated with the end user 209. For example, the subnetwork 213 may be a network maintained by the end user's employer or any other institution with which the end user is associated, such as a school, research center, or the like. The subnetwork 213 includes a data store 215 that stores data associated with the end user 209. Thus, the data store 215 may store data used by a Microsoft Exchange® server or a Lotus Domino® server that contains contact information associated with the end user 209. If the end user 209 is a sales representative for an employer that maintains subnetwork 213, then the data store 215 may, e.g., include the name, telephone number, electronic mail address, and other address information relating to sales prospects of the employer. The subnetwork 213 may also include a firewall 217 to protect the subnetwork 213 from unauthorized access. Such firewalls are well known in the art, and thus will not be described here in detail.

As will be explained in detail below, the adaptive synchronization device 203 synchronizes the end user's service data stored in the data store 215 on one side of the firewall 217 with service data for the end user 209 stored in a synchronization service data store 219 maintained on an opposite side of firewall 217. As seen in FIG. 2, the synchronization service data store 219 provides service data to the service provider infrastructure systems 205 and the service provider data stores 211. Using this arrangement, the service providers can employ service data stored behind the firewall 217 in data store 215 without having to actually penetrate the firewall 217. Instead, the service provider infrastructure systems 205 and the service provider data stores 211 can directly access the service data from the synchronization service data store 219.

Figure 3:
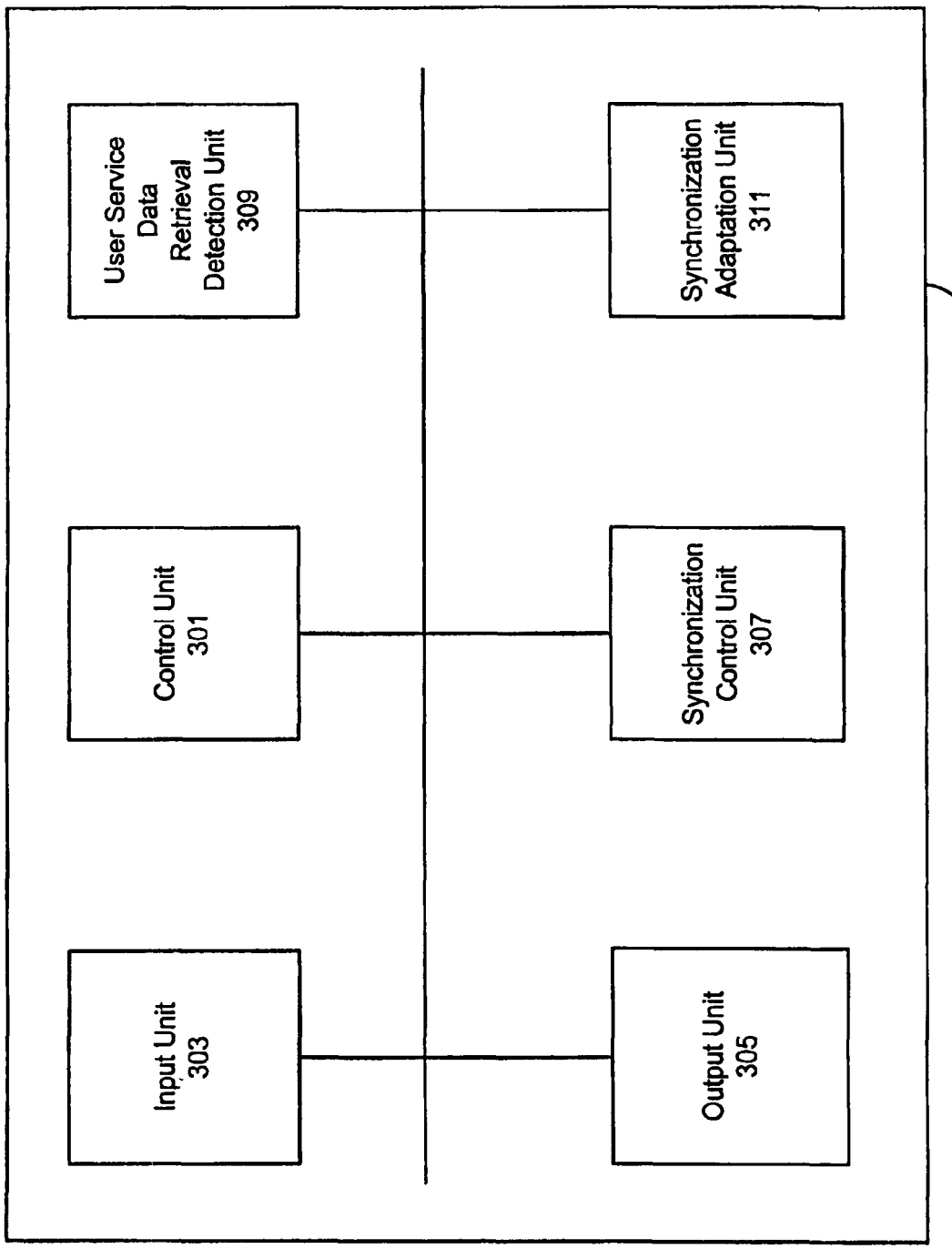
FIG. 3 illustrates a synchronization device according to one embodiment of the invention.

FIG. 3 illustrates the adaptive synchronization device 203 in more detail. As seen in this figure, the adaptive synchronization device 203 includes a control unit 301, an input unit 303, and an output unit 305. The adaptive synchronization device 203 also includes a synchronization process unit 307, a user service data access detection unit 309, and a synchronization adaptation unit 311. The control unit 301 operates to control the exchange of information between each of the other control units 303-311.

As will be appreciated by those of ordinary skill in the art, one or more components of the adaptive synchronization device 203 can be embodied using software implemented on a computer system, such as the computer system 101 described with regard to FIG. 1 above. For example, the input unit 303, the output unit 305, the synchronization process unit 307, the user service data access detection unit 309, and the synchronization adaptation unit 311 can each be embodied by software subroutines. The control unit 301 may then be a control software routine that calls the various software subroutines embodying the different units 303-311. Of course, those of ordinary skill in the art will appreciate that one or more of the units 301-311 may also be embodied by electronic circuitry.

The input unit 303 receives information provided from outside of the adaptive synchronization device 203. For example, the input unit 303 may receive messages from the synchronization service data store 219 or receive service data from the data store 315. Similarly, the output unit 305 transmits information to devices outside of the adaptive synchronization device 203. Thus, the output unit 203 may transmit control messages to the synchronization service data store 219, transmit request messages requesting information from the data store 315, and transmit service data received by the input unit 303 from the data store 315 to the synchronization service data store 219. The operation of the input unit 303 and output unit 305 are known in the art, and thus will not be discussed in here detail.

The synchronization unit 307 controls the synchronization of data between the data store 215 and the synchronization service data store 219. That is, the synchronization unit 307 operates to ensure that a user's service data stored in the synchronization service data store 219 is synchronized with the user's service data stored in the data store 215. Thus, if the data store 215 contains new user service data (or a new deletion of the user's service data) that is not stored in the synchronization service data store 219, then the synchronization unit 307 updates the synchronization service data store 219 to include the new data (or new deletion of data) during a synchronization process. Similarly, if the synchronization service data store 219 contains new user service data (or a new deletion of the user's service data) added by the user's use of the service provider's telecommunication services that is not stored in the data store 215, then the synchronization unit 307 updates the data store 215 to include the new data (or new deletion of data) during a synchronization process.

Accordingly, the synchronization unit 307 may instruct the output unit 305 to transmit a request for the service data to the data store 215, instruct the input unit 303 to receive the requested service data from the data store 215, and then instruct the output unit 305 to forward the received service data to the synchronization service data store 219. Alternately, the synchronization unit 307 may control a synchronization process that operates outside of the adaptive synchronization device 203 (e.g., a synchronization process involving direct communication between the data store 215 and the synchronization service data store 219, or involving another intermediary device between the data store 215 and the synchronization service data store 219).

The user service data retrieval detection unit 309 detects the retrieval of service data for the end user 209 from the synchronization service data store 219. More particularly, the user service data retrieval detection unit 309 detects the retrieval of service data for a user by a service provider infrastructure system 205 or a service provider service data store 211. According to some embodiments of the invention, the user service data retrieval detection unit 309 detects and records the occurrence of each retrieval of service data associated with the end user 209 from the synchronization service data store 219. With alternate embodiments of the invention, the user service data retrieval detection unit 309 detects and records the quantity of retrieved service data each time that service data associated with the end user 209 is retrieved from the synchronization service data store 219. According to still other embodiments of the invention, the user service data retrieval detection unit 309 detects and records both the occurrence of each retrieval of service data associated with the end user 209 and the quantity of service data retrieved.

The synchronization adaptation unit 311 then employs the information obtained by the user service data retrieval detection unit 309 to determine the retrieval amount of the user's service data from the synchronization service data store 219, and whether the retrieval amount has increased or decreased. It should be noted that the synchronization adaptation unit 311 may determine the retrieval amount in a variety of ways. For example, with some embodiments of the invention, the synchronization adaptation unit 311 determines the retrieval amount based upon the frequency of retrieval of the user's service data in the synchronization service data store 219.

Further, if the synchronization adaptation unit 311 determines the retrieval amount of the user's service data based upon the frequency at which the service data has been retrieved, the frequency value may also be determined in a variety of ways. For example, the synchronization adaptation unit 311 can determine the service data retrieval frequency based solely upon the two most recent retrievals of the user's service data from the synchronization service data store 219. Thus, if the service provider infrastructure system 205A made a first request for service data for the user at 1:00 A.M., the service provider infrastructure system 205B made a second request for service data for the user at 1:30 A.M. and the service provider infrastructure system 205C made a third request for service data for the user at 1:45 A.M., then the synchronization adaptation unit 311 would determine the frequency of access to the user's service data to be once every 15 minutes.

Alternately, the synchronization adaptation unit 311 could determine the retrieval frequency by averaging together the intervals between a predetermined number of retrievals requested from the synchronization service data store 219. Thus, if the synchronization adaptation unit 311 determines the retrieval frequency by averaging together the intervals between the three most recent retrieval requests for service data for a user, then synchronization adaptation unit 311 would determine a retrieval frequency of 22.5 minutes by averaging the interval between the first request and the second request (i.e., 30 minutes) with the interval between the second request and the third request (i.e., 15 minutes). Still further, the synchronization adaptation unit 311 could determine the retrieval frequency based upon the number of requests for service data for a user received during a predetermined time period, e.g., each hour. With this embodiment, for the above example the synchronization adaptation unit 311 would determine the retrieval frequency to be every twenty minutes (i.e., the average of three retrieval requests within 60 minutes).

In alternate embodiments of the invention, the synchronization adaptation unit 311 may determine the retrieval amount of the user's service data based upon the quantity of service data retrieved from the synchronization service data store 219. As before, the quantity of retrieved service data can be measured in a variety of ways. Thus, the quantity value can be defined by using individually retrieved record fields of the service data, based upon a specified window of time over which the retrieved service data was accumulated, or by using the number of records retrieved from the synchronization service data store 219.

For example, if the retrieved service data for the user is electronic mail messages, the value of the quantity of retrieved service data could be determined based upon the number of retrieved electronic mail file folders. With alternate embodiments of the invention, the value of the quantity of retrieved service data could be determined based upon the specific period of time (e.g., five days) over which the retrieved messages were received. For still other embodiments of the invention, the value of the quantity of retrieved service data could be determined based simply upon the number of retrieved messages (e.g., 50 electronic mail messages). As will be appreciated by those of ordinary skill in the art, the particular method for determining the quantity of the retrieved service data for a user can be determined according to any technique suitable to the desired application of the invention.

In still other embodiments of the invention, the synchronization adaptation unit 311 may determine the retrieval amount based on selection events initiated by the user. For example, if a user unsuccessfully attempts to select data, such as an e-mail message or appointment that falls outside of the currently synchronized amount (e.g., where such an amount is initially determined by, for example, a date range relative to the then-current date), then the synchronization adaptation unit 311 may immediately adjust the applicable data amount for the user to ensure that a subsequent request for the data will be successful. When doing so, the synchronization adaptation unit 311 may also communicate to the user that the adjustment has been made and when, based on the then-current interval, the user should reattempt the request. Other various embodiments of the invention may even adjust the data amount on a predictive basis before an unsuccessful data request actually occurs. For example, if the user has made multiple requests for data in a short period of time where such data fall close to the then-current "boundary" for that particular data type, then the synchronization adaptation unit 311 may pro-actively adjust the boundary on the assumption that a spike in activity near a "boundary" is an indicator that a request for data beyond the "boundary" is more likely to occur. The synchronization adaptation unit 311 may then readjust the data amount if this activity pattern subsides.

According to still other embodiments of the invention, the synchronization adaptation unit 311 may determine the amount of retrieved service data for the user based upon both the frequency of retrieval requests and the quantity of data obtained during each retrieval. Thus, the synchronization adaptation unit 311 may determine both a retrieval frequency value and a retrieved service data quantity value. Alternately, the synchronization adaptation unit 311 may determine a single retrieval amount value using both a determined retrieval frequency and a determined of quantity of retrieved service data. For example, the synchronization adaptation unit 311 may multiply a determined retrieval frequency by a first constant, multiply a determined retrieval quantity by a second constant, and then add the two resulting values to obtain a single service data retrieval amount value. Again, as will appreciated by those of ordinary skill in the art, the particular method for determining a retrieval amount of retrieved service data for a user can be determined by using any suitable technique appropriate to the desired application of the invention.

As previously noted, the synchronization adaptation unit 311 also determines whether the determined retrieval amount of retrieved service data for a user is an increase or a decrease over the previously determined retrieval amount of retrieved service data for the user. Thus, if the synchronization adaptation unit 311 determines the retrieval amount to be the retrieval frequency based upon the interval between the most recent two retrieval requests, then for the above example (using the first, second and third requests) the synchronization adaptation unit 311 will determine a first retrieval frequency of one per thirty minutes, and a second retrieval frequency of one per fifteen minutes. With this example, the synchronization adaptation unit 311 would then determine that the second retrieval frequency, and thus the retrieval amount, has increased over the first retrieval frequency.

In addition to determining the retrieval amount of retrieved service data for a user and whether this retrieval amount is an increase or a decrease over the previously determined retrieval amount, the synchronization adaptation unit 311 also determines the synchronization amount for synchronizing service data between the data store 215 and the synchronization service data store 219. More particularly, the synchronization adaptation unit 311 determines the synchronization amount based upon the whether the determined retrieval amount has increased or decreased over previously determined retrieval amounts.

As used herein, the term synchronization amount includes any synchronization parameter that, when increased, improves the operation of the synchronization process (e.g., the quantity of data synchronized during a synchronization process). The term synchronization amount includes the inverse of any synchronization parameter that, when decreased, improves the operation of the synchronization process (e.g., the inverse of the interval between synchronization processes, or the synchronization frequency).

Thus synchronization adaptation unit 311 can determine the synchronization amount according to a variety of techniques. For some embodiments of the invention, the synchronization adaptation unit 311 determines the synchronization amount to be the frequency at which the user's service data stored in the data store 215 is synchronized with the user's service data stored in the synchronization service data store 219. According to still other embodiments of the invention, the synchronization amount is the quantity of service data synchronized between the data store 215 and the synchronization service data store 219 during a synchronization process. With still further embodiments of the invention, the synchronization amount includes both the quantity of service data synchronized between the data store 215 and the synchronization service data store 219 and the frequency of synchronization. Of course, the synchronization amount may also be or include other synchronization parameters (or their inverses) as desirable for the particular application of the invention.

It should be noted that the synchronization adaptation unit 311 can determine the synchronization amount based upon an increase or decrease of any type of determined retrieval amount. Thus, the synchronization adaptation unit 311 can use an increase or decrease in a retrieval amount that includes both the retrieval frequency and the quantity of retrieved service data to determine a synchronization amount that includes both the frequency of synchronization and the quantity of synchronized service data. With this example, the synchronization adaptation unit 311 can increase the synchronization frequency when the retrieval frequency increases, and decrease the synchronization frequency when the retrieval frequency decreases. Similarly, the synchronization adaptation unit 311 can increase the quantity of synchronized service data when the quantity of retrieved service data increases, and decrease the quantity of synchronized service data when the quantity of retrieved service data decreases.

With still other embodiments of the invention, the synchronization adaptation unit 311 can use an increase or decrease in a retrieval amount that includes both the retrieval frequency and the quantity of retrieved service data to determine a synchronization amount that includes only the frequency of synchronization, or only the quantity of synchronized service data. In alternate embodiments of invention, the synchronization adaptation unit 311 can use an increase or decrease in a retrieval amount that includes only the retrieval frequency or only the quantity of retrieved service data to determine a synchronization amount that includes both the frequency of synchronization and the quantity of synchronized service data. As will be appreciated by those of ordinary skill in the art upon a review of this application, an increase or decrease in any combination of types of retrieval amount values can be used to determine an increase or decrease in any combination of types of synchronization amount values, as appropriate for the desired application of the invention.

Figure 4:
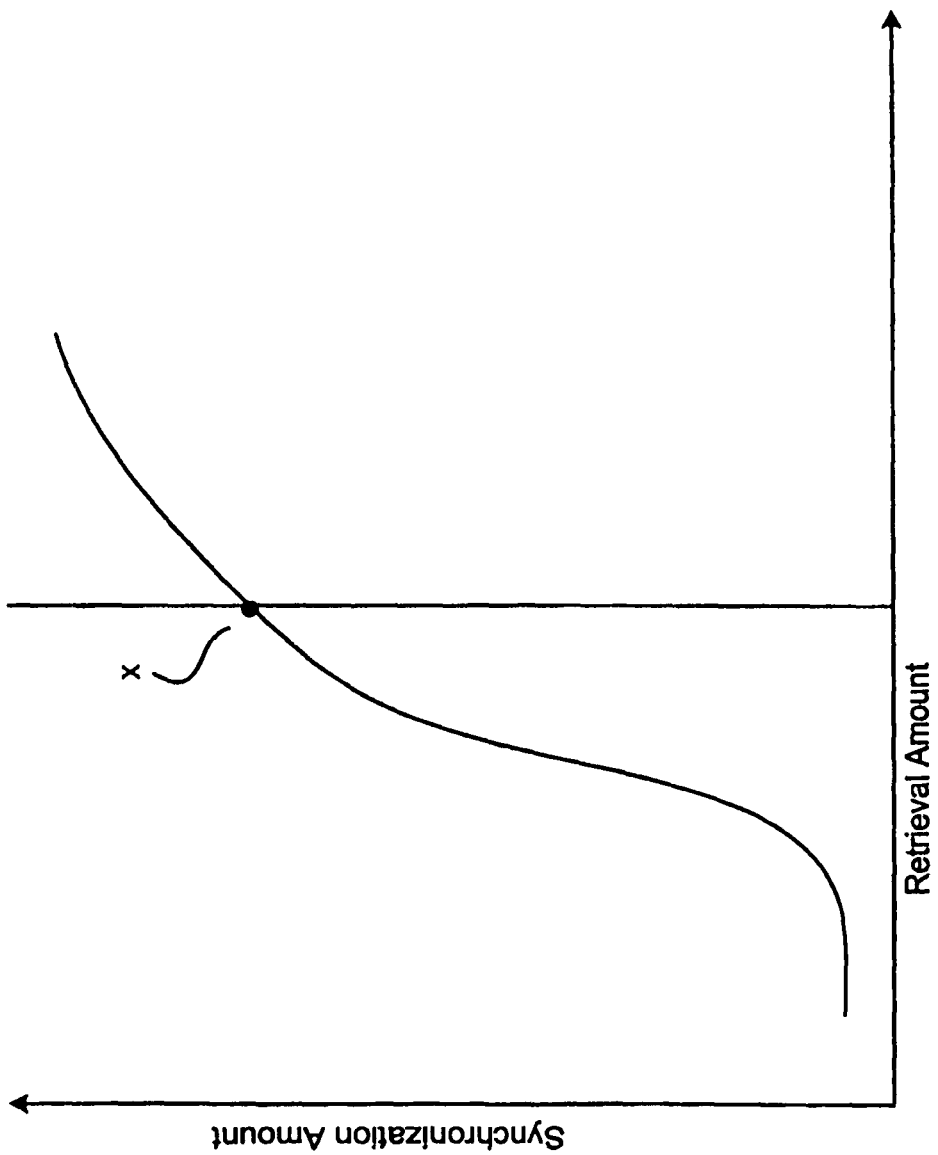
FIG. 4 illustrates one example of a bell curve according to which a synchronization amount may be increased or decreased in response to an increased or decreased use of service data, respectively.

It should also be noted that the synchronization adaptation unit 311 can determine the specific increase or decrease in the synchronization amount according to a variety of techniques. According to some embodiments of the invention, for example, the synchronization adaptation unit 311 increases the synchronization amount based upon an increase in the retrieval amount according to the lower half of a bell curve, such as the half bell curve shown in FIG. 4.

As seen in this figure, the degree to which the synchronization amount is increased significantly as the value of the retrieval amount increases from zero to a threshold value X. Then, as the value of the retrieval amount continues to increase from the threshold value X to a maximum, the degree to which the synchronization amount is increased declines to zero. For example, a "light" end user whose telecommunication use requires his or her service provider to have a relatively low service data retrieval amount for the user's service data may have an initial synchronization interval of 45 minutes. As the user's service data retrieval amount increased, the synchronization adaptation unit 311 might then cut the synchronization by a third to 15 minutes, and then, with a still increased retrieval amount, again by a third, to a five-minute synchronization interval.

Advantageously, this arrangement accounts for abrupt changes in user behavior. One such change in behavior that is particularly risky is the "trade show effect," or light users who on occasion quickly become heavy users for short periods of time (the risk being that they have a poor user experience because the synchronization parameters have adjusted to be very high). For example, an end user who is a product manager for his or her employer may generally be a light user (i.e., who requires his or her service provider to infrequently retrieve his or her service data from the synchronization service data store 291), but relies rather heavily on the service provider's telecommunication services when on the road for trade shows. While at the trade shows, the user will experience evident service data synchronization deficiencies only initially, because, according to the invention, the service data synchronization amount increases the more the telecommunication services are used.

According to some embodiments of the invention, the synchronization adaptation unit 311 will also decrease the synchronization amount according to a rate corresponding to one half of a bell curve. Thus, even if the carrier chooses to cut the synchronization amount (e.g., the synchronization interval) dramatically after an end user's first usage of the service data (thereby quickly improving the user's experience), its costs will not significantly increase because the synchronization amount will readjust to become smaller as the user stops using the device. Only that short interval of time will have entailed high costs to the provider, and the total cost over time is much lower than if, e.g., the frequency of synchronization were constant. It should be noted that the bell curve may be that same as the bell curve governing the increase rate. Alternately, the synchronization adaptation unit 311 may provide a hysteresis effect by employing a different bell curve than the rate of synchronization amount increase, or by decreasing the synchronization amount according to a different rate pattern altogether The present invention has been described above by way of specific exemplary embodiments, and the many features and advantages of the present invention are apparent from the written description. Thus, it is intended that the appended claims cover all such features and advantages of the invention. Further, because numerous modifications and changes will readily occur to those skilled in the art, the specification is not intended to limit the invention to the exact construction and operation as illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A mail server system for adaptively adjusting a polling interval, comprising:
    a mail server comprising a first email data store;
    one or more processing units in data communication with the first email data store and configured to cause the mail server system to:
        set a first polling interval for a first user, wherein the first polling interval defines a time interval at which the mad server polls a second email data store to detect one or more new emails associated with the first user;
        retrieve the one or more new emails associated with the first user from the second email data store and store the one or more new emails associated with the first user on the first email data store; and
        alter the first polling interval based on one or more new email retrievals associated with the first user.

2. The mail server system according to claim 1, wherein the one or more processing units are further configured to:
    determine a polling parameter based on the one or more new email retrievals; and
    decrease the first polling interval based on the polling parameter.

3. The mail server system according to claim 1, wherein the one or more processing units are further configured to:
    determine a polling parameter based on the one or more new email retrievals;
    increase the first polling interval based on the polling parameter.

4. The mail server system according to claim 1, wherein the one or more processing units are further configured to:
    determine a polling parameter based on the one or more new email retrievals; and
    decrease the first polling interval in response to the polling parameter rising above a predetermined threshold.

5. The mail server system according to claim 1, wherein the one or more processing units are further configured to:
    determine a polling parameter based on the one or more new email retrievals; and
    increase the first polling interval in response to the polling parameter falling below a predetermined threshold.

6. The mail server system according to claim 1, wherein the one or more processing units are further configured to: decrease the first polling interval based on an increase in new email retrievals associated with the first user.

7. The mail server system according to claim 1, wherein the one or more processing units are further configured to: increase the first polling interval based on a decrease in new email retrievals associated with the first user.

8. The mail server system according to claim 2, wherein the polling parameter is a frequency of new email retrievals.

9. The mail server system according to claim 3, wherein the polling parameter is a frequency of new email retrievals.

10. The mail server system according to claim 4, wherein the polling parameter is a frequency of new email retrievals.

11. The mail server system according to claim 5, wherein the polling parameter is a frequency of new email retrievals.

12. The mail server system according to claim 2, wherein the polling parameter is based upon a number of new emails retrieved during a most recent polling interval.

13. The mail server system according to claim 3, wherein the polling parameter is based upon a number of new emails retrieved during a most recent polling interval.

14. The mail server system according to claim 4, wherein the polling parameter is based upon a number of new emails retrieved during a most recent polling interval.

15. The mail server system according to claim 5, wherein the polling parameter is based upon a number of new emails retrieved during a most recent polling interval.

16. The mail server system according to claim 1, wherein the one or more processing units are further configured to:
    set a second polling interval for a second user, wherein the second polling interval defines a time interval at which the mail server polls the second email data store to detect one or more new emails associated with the second user;
    retrieve the one or more new emails associated with the second user from the second email data store and store the one or more new emails associated with the second user on the first email data store; and
    alter the second polling interval based on one or more new email retrievals associated with the second user,
    wherein the second polling interval is different than the first polling interval.

17. A method of adaptively adjusting a polling interval in a mail server system comprising a mail server comprising a first email data store, the method comprising:
    setting a first polling interval for a first user, wherein the first polling interval defines a time interval at which the mail server polls a second email data store to detect one or more new emails associated with the first user;
    retrieving the one or more new emails associated with the first user from the second email data store and storing the one or more new emails associated with the first user on the first email data store; and
    altering the first polling interval based on one or more new email retrievals associated with the first user.

18. The method according to claim 17, further comprising:
    determining a polling parameter based on the one or more new email retrievals; and
    decreasing the first polling interval based on the polling parameter.

19. The method according to claim 17, further comprising:
    determining a polling parameter based on the one or more new email retrievals;
    increasing the first polling interval based on the polling parameter.

20. The method according to claim 17, further comprising:
    determining a polling parameter based on the one or more new email retrievals; and
    decreasing the first polling interval in response to the polling parameter rising above a predetermined threshold.

21. The method according to claim 17, further comprising:
    determining a polling parameter based on the one or more new email retrievals; and
    increasing the first polling interval in response to the polling parameter falling below a predetermined threshold.

22. The method according to claim 17, further comprising:
    decreasing the first polling interval based on an increase in new email retrievals associated with the first user.

23. The method according to claim 17, further comprising:
    increasing the first polling interval based on a decrease in new email retrievals associated with the first user.

24. The method according to claim 18, wherein the polling parameter is a frequency of new email retrievals.

25. The method according to claim 19, wherein the polling parameter is a frequency of new email retrievals.

26. The method according to claim 20, wherein the polling parameter is a frequency of new email retrievals.

27. The method according to claim 21, wherein the polling parameter is a frequency of new email retrievals.

28. The method according to claim 18, wherein the polling parameter is based upon a number of new emails retrieved during a most recent polling interval.

29. The method according to claim 19, wherein the polling parameter is based upon a number of new emails retrieved during a most recent polling interval.

30. The method according to claim 20, wherein the polling parameter is based upon a number of new emails retrieved during a most recent polling interval.

31. The method according to claim 21, wherein the polling parameter is based upon a number of new emails retrieved during a most recent polling interval.

32. The method according to claim 17, further comprising:
    setting a second polling interval for a second user, wherein the second polling interval defines a time interval at which the mail server polls the second email data store to detect one or more new emails associated with the second user;
    retrieving the one or more new emails associated with the second user from the second email data store and storing the one or more new emails associated with the second user on the first email data store; and
    altering the second polling interval based on one or more new email retrievals associated with the second user,
    wherein the second polling interval is different than the first polling interval.

33. A non-transitory, computer-readable medium having computer-readable instructions stored thereon, the computer-readable instructions being configured to be executed by one or more processing units in a mail server system comprising a mail server comprising a first email data store, the computer-readable instructions being further configured to cause the mail server system to perform a method of adaptively adjusting a polling interval, the method comprising:
    setting a first polling interval for a first user, wherein the first polling interval defines a time interval at which a mail server polls a second email data store to detect one or more new emails associated with the first user;
    retrieving the one or more new emails associated with the first user from the second email data store and storing the one or more new emails data associated with the first user on the first email data store; and
    altering the first polling interval based on one or more new email retrievals associated with the first user.

34. The non-transitory, computer-readable medium of claim 33, wherein the method further comprises:
    determining a polling parameter based on the one or more new email retrievals; and decreasing the first polling interval based on the polling parameter.

35. The non-transitory, computer-readable medium of claim 33, wherein the method further comprises:
   determining a polling parameter based on the one or more new email retrievals;
   increasing the first polling interval based on the polling parameter.

36. The non-transitory, computer-readable medium of claim 33, wherein the method further comprises:
   determining a polling parameter based on the one or more new email retrievals; and
   decreasing the first polling interval in response to the polling parameter rising above a predetermined threshold.

37. The non-transitory, computer-readable medium of claim 33, wherein the method further comprises:
   determining a polling parameter based on the one or more new email retrievals; and
   increasing the first polling interval in response to the polling parameter falling below a predetermined threshold.

38. The non-transitory, computer-readable medium of claim 33, wherein the method further comprises: decreasing the first polling interval based on an increase in new email retrievals associated with the first user.

39. The non-transitory, computer-readable medium of claim 33, wherein the method further comprises: increasing the first polling interval based on a decrease in new email retrievals associated with the first user.

40. The non-transitory, computer-readable medium of claim 34, wherein the polling parameter is a frequency of new email retrievals.

41. The non-transitory, computer-readable medium of claim 35, wherein the polling parameter is a frequency of new email retrievals.

42. The non-transitory, computer-readable medium of claim 36, wherein the polling parameter is a frequency of new email retrievals.

43. The non-transitory, computer-readable medium of claim 37, wherein the polling parameter is a frequency of new email retrievals.

44. The non-transitory, computer-readable medium of claim 34, wherein the polling parameter is based upon a number of new emails retrieved during a most recent polling interval.

45. The non-transitory, computer-readable medium of claim 35, wherein the polling parameter is based upon a number of new emails retrieved during a most recent polling interval.

46. The non-transitory, computer-readable medium of claim 36, wherein the polling parameter is based upon a number of new emails retrieved during a most recent polling interval.

47. The non-transitory, computer-readable medium of claim 37, wherein the polling parameter is based upon a number of new emails retrieved during a most recent polling interval.

48. The non-transitory, computer-readable medium of claim 33, wherein the method further comprises:
   setting a second polling interval for a second user, wherein the second polling interval defines a time interval at which the mail server polls the second email data store to detect one or more new emails associated with the second user;
   retrieving the one or more new emails associated with the second user from the second email data store and storing the one or more new emails associated with the second user on the first email data store; and
   altering the second polling interval based on one or more new email retrievals associated with the second user,
   wherein the second polling interval is different than the first polling interval.

49. A mail server system for adaptively adjusting a polling interval, comprising:
   a mail server comprising a first email data store;
   one or more processing units in data communication with the first email data store and configured to cause the mail server system to:
   set a first polling interval for a first user, wherein the polling interval defines a time interval at which the mail server polls a second email data store to detect one or more new emails associated with the first user;
   retrieve the one or more new emails associated with the first user from the second email data store and store the one or more new emails associated with the first user on the first email data store;
   increase the first polling interval based on a decrease in new email retrievals associated with the first user;
   set a second polling interval for a second user, wherein the second polling interval defines a time interval at which the mail server polls the second email data store to detect one or more new emails associated with the second user;
   retrieve the one or more new emails associated with the second user from the second email data store and store the one or more new emails associated with the second user on the first email data store; and
   increase the second polling interval based on a decrease in new email retrievals associated with the second user.

50. A method of adaptively adjusting a polling interval in a mail server system comprising mail server comprising a first email data store, the method comprising:
   setting a first polling interval for a first user, wherein the polling interval defines a time interval at which the mail server polls a second email data store to detect one or more new emails associated with the first user;
   retrieving the one or more new emails associated with the first user from the second email data store and storing the one or more new emails associated with the first user on the first email data store;
   increasing the first polling interval based on a decrease in new email retrievals associated with the first user;
   setting a second polling interval for a second user, wherein the second polling interval defines a time interval at which the mail server polls the second email data store to detect one or more new emails associated with the second user;
   retrieving the one or more new emails associated with the second user from the second email data store and storing the one or more new emails associated with the second user on the first email data store; and
   increasing the second polling interval based on a decrease in new email data retrievals associated with the second user.

* * * * *